May 8, 1956     J. W. DYER ET AL     2,744,282

WINDSHIELD WIPER MECHANISM

Filed Oct. 15, 1952

INVENTORS
JOHN W. DYER
JAMES H. FLATT
BROOKS H. SHORT

BY

*Willets, Hardman and Fehr*

THEIR ATTORNEYS

United States Patent Office 2,744,282
Patented May 8, 1956

2,744,282

WINDSHIELD WIPER MECHANISM

John W. Dyer, Pendleton, and James H. Flatt and Brooks H. Short, Anderson, Ind., assignors to General Motors Corporation, Detroit, Mich., a corporation of Delaware Application October 15, 1952, Serial No. 314,872

4 Claims. (Cl. 15—255)

The present invention relates to windshield wiper mechanism and more particularly to a back-lash eliminator for windshield wiper transmissions.

The blades of a windshield wiper being oscillated at a rapid rate, tend to over-travel the normal stroke ends, thereby resulting in the blades slapping or contacting cowl portions of the motor vehicle on which they are installed. This phenomenon is a source of consternation to the vehicle operator and the annoyance caused thereby often distracts the operator. Over-travel or back-lash, as it will hereinafter be referred to, is primarily attributable to the existence of excessive clearances in the transmission and drive mechanism for the wiper blades. The instant invention is primarily directed to a back-lash eliminator. Accordingly, one of our objects is to provide means for preventing back-lash or over-travel of wiper blades at the end of their strokes.

The aforementioned and other objects are accomplished in the present invention by providing an energy storing device which is loaded by the drive mechanism before the ends of the wiping strokes, whereby normal abrupt reversals of wiper blade movement will be of lesser intensity, and the over-travel attendant with abrupt reversals will be eliminated. Specifically, the wiper mechanism includes a motor and a drive mechanism which converts rotary movement of the motor into oscillating movement of a member. The member, forming part of the drive mechanism, is operatively connected to a tranmission for oscillating a wiper blade across the surface of the windshield. A portion of the transmission is enclosed by a housing provided with a pair of upstanding pins or abutments which are covered with nylon or some other suitable resilient material. The blade carries a substantially U-shaped spring member having diverging arm portions, the base of the spring encircling a shaft anchored to the blade. The blade is so constructed that each arm of the spring is moved into engagement with its associated abutment during the latter portions of the oscillatory stroke thereof. In this manner, the spring arms will become loaded or tensioned in a manner tending to oppose wiper blade movement towards the stroke ends before the ends of the wiper blade strokes whereby reversals of movement will occur with less abruptness and back-lash will be substantially eliminated. Thus, the spring periodically absorbs and releases energy during each cycle of blade movement.

Further objects and advantages of the present invention will be apparent from the following description, reference being had to the accompanying drawing, wherein a preferred embodiment of the present invention is clearly shown.

Figure 1:
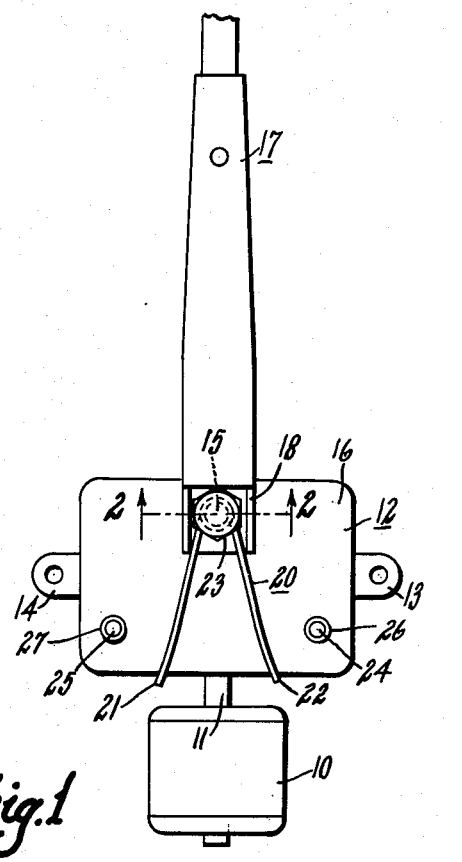
Fig. 1 is a fragmentary, plan view of a windshield wiper including the back-lash eliminator of the present invention.
Figure 2:
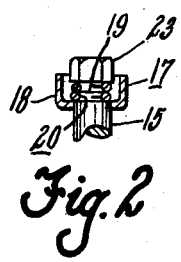
Fig. 2 is a sectional view taken on line 2—2 of Fig. 1.

The mechanism is exemplified in conjunction with an electric motor driven windshield wiper only by way of example, as it is readily apparent that the device is adapted for use with any type of windshield wiper regardless of the particular source of power for operating the same. Referring to the drawing, an electric motor 10 is illustrated as having a shaft 11 which, as shown, extends into a transmission housing 12. The transmission housing is provided with a pair of oppositely extending bracket portions 13 and 14 by which the housing may be suitably attached to a portion of a motor vehicle. A motion converting mechanism, not shown, of any suitable type well known in the art, is utilized converting rotary motion of the shaft 11 into oscillating motion of a shaft, not shown, connected through transmission mechanism to windshield cleaning means comprising a cleaner 17 and shaft 15 which projects through a wall 16 of transmission housing 12. The shaft 15 is operatively connected to said wiper blade, or cleaner, 17 adapted to engage the outer surface of a windshield, not shown.

As hereinbefore mentioned, the wiper blades tend to over-travel the normal ends of their strokes when oscillated at high speeds due to the momentum and inertia effects of the wiper blades, per se. Over-travel of the wiper blades results in undesirable noises by reason of the wiper blades contacting portions of the motor vehicle cowl on which they are installed. Over-travel or back-lash in windshield wiper mechanisms is particularly apparent where a link type transmission is utilized to connect the wiper blades to the drive mechanism therefor, due to the clearances inherent in linkages. In order to abate the effects of excessive clearances in the transmission and drive mechanism which result in wiper blade over-travel, the present invention utilizes resilient mechanism which is loaded or tensioned as the wiper blades approach the end of their strokes. In this manner the abrupt reversals of direction are reduced in intensity and over-travel of the blades is effectively prevented.

Referring again to the drawing, the blade 17 is disclosed as having a portion 18 of channeled cross section. As is shown on the drawing, the oscillating shaft 15, driven by the drive mechanism and transmission, is connected to the channeled portion 18 of the blade 17. Moreover, the shaft 15 is provided with a reduced diameter threaded portion 19 which is encircled by the base portion of a U-shaped spring 20 having diverging arm portions 21 and 22. The spring is retained in position upon the threaded portion 19 by means of a lock nut 23. It is to be understood that the spring 20 can be anchored to any portion of the blade 17 and is only shown for purposes of illustration as being connected to the threaded extension of the oscillating shaft therefor.

Mounted on the wall 16 of the housing 12 are a pair of spaced abutment members or pins 24 and 25 which are covered by resilient tubular portions 26 and 27. The resilient portions 26 and 27 may be composed of nylon or any other suitable resilient material, such as, natural or synthetic rubber. The diverging arm portions 21 and 22 of the spring are normally maintained out of engagement with the pins 25 and 24 by reason of the channeled portion 18 of the blade confining the divergence therebetween to a relatively small angle.

Figure 3:
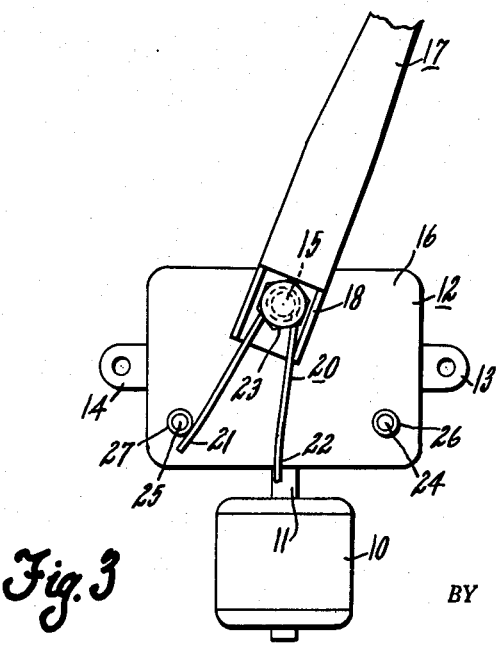
Fig. 3 is a view similar to Fig. 1, illustrating the action of the back-lash eliminator at one of the ends of a wiping stroke.

Referring to Fig. 3, the operation of the back-lash eliminator will now be described. As the blade 17 is oscillated by the shaft 15, spring arm 21 will come in contact with pin 25 during the latter portion of its movement in one direction and spring arm 22 will come into contact with pin 24 during the latter portion of its movement in the opposite direction. Back-lash or over-travel of the wiper blades may be eliminated by preventing abrupt reversals in the movement of the blade 17. Thus, as the blade 17 moves clockwise about its pivotal axis 15 to the position it is shown in in Fig. 3, the spring arm 21 will engage the resiliently covered pin 25 thereby reducing the rate of movement of the blade 17, by absorbing energy, during only the latter part of its oscillatory travel in the clockwise direction. Similarly, when blade 17 oscillates in a counterclockwise direction, spring arm 22 will reduce the rate of movement thereof during the latter part of its stroke by engaging pin 24. As the blade moves from its neutral position, shown in Fig. 1, to the position it is shown in in Fig. 3, the load imposed by the stressing of spring arm 21 will reduce the speed of the wiper blade during a predetermined portion of its stroke before the end thereof. In effect, the spring arms 21 and 22 constitute an energy storing device resulting in a variable rate of wiper blade travel across the windshield surface. The load imposed by the spring arms 21 and 22 as they engage pins 25 and 24, respectively, at the ends of the wiper strokes, effectively prevents back-lash or over-travel of the wiper blades by absorbing energy during a part of the cycle, and releasing it during another part thereof. In this manner the present invention effectively prevents the excessive clearances in the mechanism from resulting in over-travel of the wiper blade.

From the aforegoing description, it is readily apparent that the present invention provides a device which will effectively prevent over-travel of a wiper blade when it is operated at high speeds. Thus, the noise attendant with wiper over-travel, due to slapping against the cowl portions of the motor vehicle on which they are installed, will be eliminated to the relief of the vehicle operator.

While the embodiment of the present invention as herein disclosed, constitutes a preferred form, it is to be understood that the other forms might be adopted.

What is claimed is as follows:

1. In combination, oscillatable windshield cleaning means comprising a windshield cleaner and and oscillatable member, said member and said cleaner being interconnected for simultaneous movement, drive means operatively connected to said member for oscillating the same throughout a predetermined stroke, a U-shaped spring having diverging arm portions, the base of said spring being anchored to said oscillatable cleaning means, and a pair of spaced abutment member located adjacent opposite ends of the oscillatory stroke of said spring, each of which is engageable with one of said spring arms during a portion of cleaner travel whereby the abruptness of movement reversals of said cleaner is reduced.

2. In combination, oscillatable windshield cleaning means comprising a windshield cleaner and an oscillatable member, drive means operatively connected to said member for oscillating the same throughout a predetermined stroke, a housing enclosing a portion of said drive means, a U-shaped spring having diverging arm portions, the base of said spring being anchored to said cleaning means, and a pair of spaced abutment members rigidly attached to said housing and located at adjacent opposite ends of the oscillatory stroke of said spring, each of said abutment members being engageable with one of said spring arms during the latter portion of the oscillatory movement of said cleaner whereby the abruptness of movement reversals of said cleaner will be reduced.

3. In combination, a windshield cleaner, means for imparting oscillation to said cleaner throughout a predetermined stroke including an oscillatable shaft, a stationary support, an elongated spring having a portion encircling said shaft and operatively connected thereto for oscillation therewith, and an abutment attached to said stationary support and located adjacent one stroke end of said spring, said spring having an end portion resiliently engageable with said abutment adjacent said one stroke end of the spring for reducing the abruptness of movement reversal of said cleaner adjacent said one stroke end.

4. In combination, a windshield cleaner, means for imparting oscillation to said cleaner throughout a predetermined stroke, said cleaner having a channeled portion, a U-shaped spring having diverging arm portions, the bight of said spring being connected to said cleaner and disposed within said channeled portion, said channeled portion confining the divergence of said spring arm portions, and a pair of spaced abutments located at adjacent opposite ends of the oscillatory stroke of said spring, said abutments being cooperable with said spring arm portions and engageable therewith for reducing the abruptness of movement reversals of said cleaner.

References Cited in the file of this patent

UNITED STATES PATENTS

| 2,100,188 | Hansmann | Nov. 23, 1937 |
| 2,488,122 | Griffith | Nov. 15, 1949 |

FOREIGN PATENTS

| 645,731 | France | Oct. 30, 1928 |